April 23, 1968     J. H. JENKINS     3,379,303
SLIDE HOLDER

Filed May 31, 1966     2 Sheets-Sheet 1

INVENTOR:
JOHN H. JENKINS
BY Gravely, Lieder & Woodruff
ATTORNEYS.

April 23, 1968     J. H. JENKINS     3,379,303

SLIDE HOLDER

Filed May 31, 1966     2 Sheets-Sheet 2

INVENTOR:
JOHN H. JENKINS

BY Gravely, Lieder & Woodruff
ATTORNEYS.

3,379,303
SLIDE HOLDER
John H. Jenkins, 1525 Andrew Drive,
Warson Woods, Mo. 63122
Filed May 31, 1966, Ser. No. 554,944
3 Claims. (Cl. 206—62)

ABSTRACT OF THE DISCLOSURE

A container made from low density plastic material, said container having a bottom and top portion adapted to be secured in assembled relation by pressure-sensitive tape after articles have been placed in holding means in said container.

---

This invention relates to a slide holder for glass slides for the storing or mailing of glass slides and to hold various quantities of glass slides. This slide holder is made from plastic material that has been expanded into a low density material which contains tiny enclosed cells, such as plastic polystyrene, expanded polyethylene, urethane foam, and polyurethane, and styrofoam. This slide holder may be made in various sizes, will make storage more efficient, and is used for mailing with less breakage of slides. It also greatly reduces the cost of mailing.

A principal object of the present invention is to provide a convenient expanded plastic container for holding a plurality of slides or other fragile articles, said container having a lid portion adapted to be applied thereto, said container adapted to receive pressure-sensitive adhesive tape to keep the lid secured to the body portion. Another object is to provide a shipping container which can be closed and reopened without difficulty and which itself protects the fragile articles therein. These and other objects and advantages will become apparent hereinafter.

The present invention is embodied in a container made from low density plastic material, said container having a bottom and top portion adapted to be secured in assembled relation after articles have been placed in the holding means therein by pressure-sensitive adhesive tape. The invention is also embodied in the package so formed.

The invention also consists in the parts and in the arrangements and combinations of parts hereinafter described and claimed. In the accompanying drawings, which form part of the specification and wherein like numerals and letters refer to like parts wherever they occur:

Figure 1:
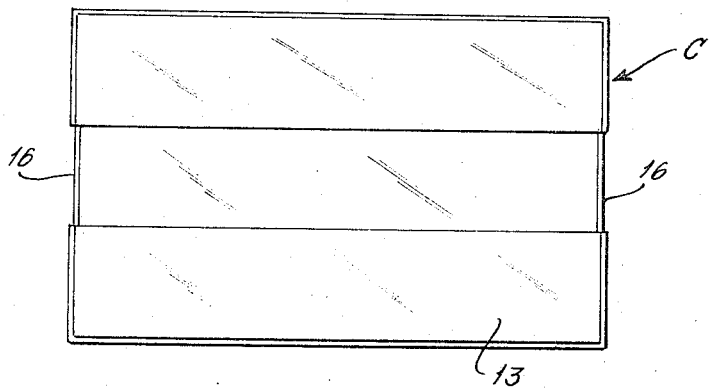
FIG. 1 is a top plan view of a container embodying the present invention.
Figure 2:
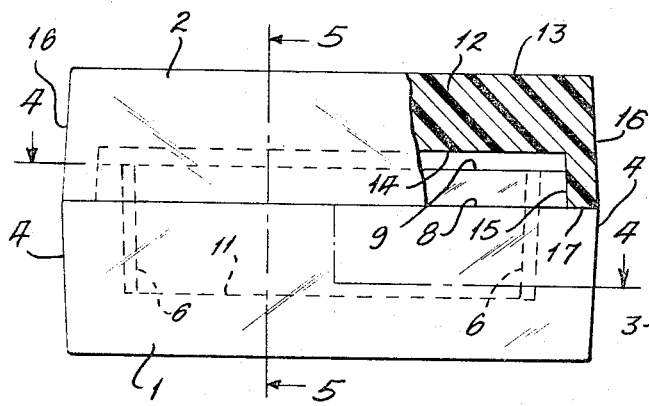
FIG. 2 is a side elevational view thereof, partly in section.

Referring now to the drawings in detail, it will be seen that the embodiment of the invention which has been illustrated comprises a container C having a bottom portion 1 and a top portion 2. The bottom portion 1 has two relatively thick side walls 3 and two relatively thick end walls 4. The end walls 4 have inner walls with grooves 5 therein formed by inwardly extending ribs 6. The grooves 5 are dimensioned to receive the end edges of glass slides of a standard dimension normally used in medical laboratories. The bottom portion 1 has an upstanding flange 7 around its inner portion of the top wall 8. The flange 7 has an upper surface 9. The surface of the top wall 8 circumscribes said flange 7. The inner portion of the flange 7 in contacting relation, and have bottom portions end walls 3 and 4. The bottom portion 1 has a relatively thick bottom 10 with an inner bottom surface 11.

The top portion 2 has a relatively thick top 12 having an outer top 13 and an inner top surface 14. The top portion 2 has side walls 15 and end walls 16 which are thinner than the corresponding walls of the bottom portion 1. The top walls 15 and 16 fit outwardly of the upstanding flange 7 in contacting relation, and have bottom portions 17 which seat on the top surface 8 of the bottom walls 3 and 4.

When the top and bottom portions are together, with slides therein, they form a complete protective enclosure for the slides. The portions 1 and 2 are adapted to be retained together by a wide piece of pressure-sensitive tape 18 having an address card printed thereon.

Figure 3:
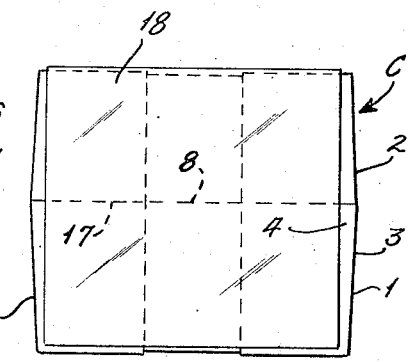
FIG. 3 is an end view of said container with pressure-sensitive adhesive tape applied.
Figure 4:
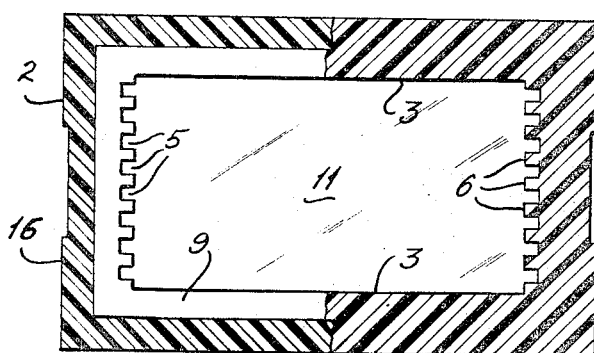
FIG. 4 is a horizontal cross-sectional view taken along the line 4—4 of FIG. 2.
Figure 5:
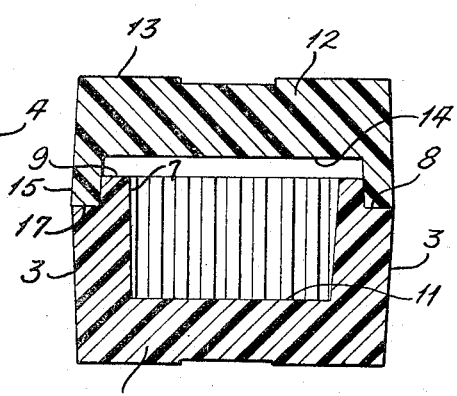
FIG. 5 is a vertical cross-sectional view taken along the line 5—5 of FIG. 2.

In practice, a doctor may prepare a number of slides, place the edges thereof in the grooves 5 and slide them downwardly, place the lid 2 thereon, address the address portion of the pressure-sensitive adhesive tape 18, place the tape 18 around three surfaces of the container C, and drop the package into a mail box. The tape 18 has a central portion which is secured to the top of the box, and two end portions which cover the horizontal line of contact of the end walls 4 and 16 of the top 2 and the bottom 1 of the container C, as shown in FIG. 3. The slides can move only within small limits within the grooves 5 and in a vertical direction, since the distance between the bottom surface 11 of the bottom 1 and the inner surface 14 of the top 2 is about the height of the slides.

Figure 6:
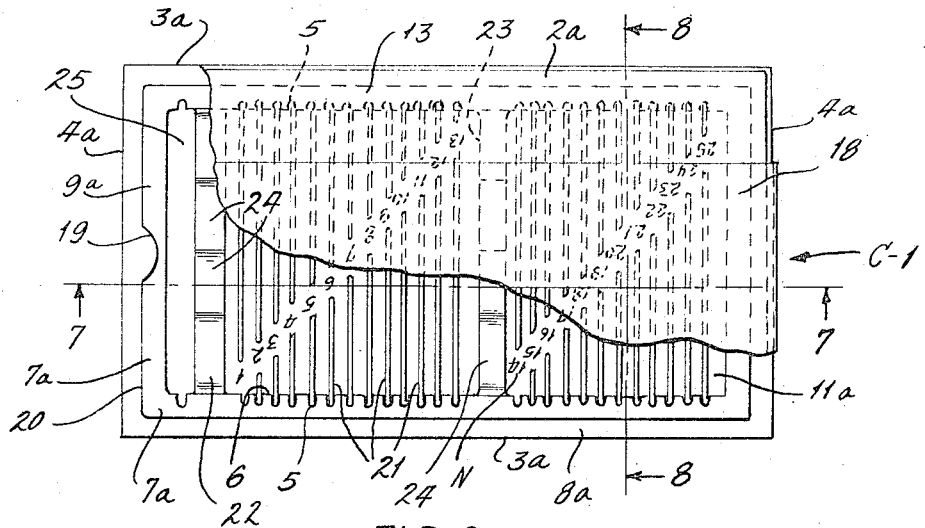
FIG. 6 is a top plan view of a modified container embodying the present invention, showing a portion of the top broken away.
Figure 7:
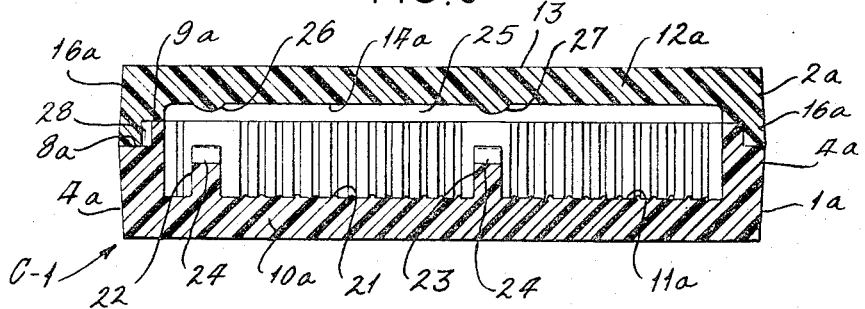
FIG. 7 is a vertical cross-sectional view taken along the line 7—7 of FIG. 6.
Figure 8:
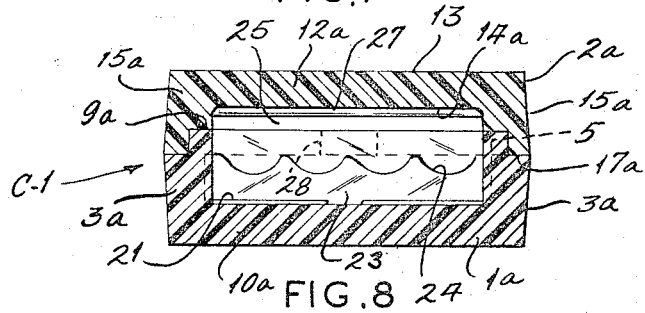
FIG. 8 is a vertical cross-sectional view taken along the line 8—8 of FIG. 6.

A modified form of the invention is embodied in the container C–1 shown in FIGS. 6, 7, and 8. As in the principal form of the invention, the modified container is made from expanded plastic low density material which contains tiny enclosed cells. Such material includes polystyrene, expanded polyethylene, urethane foam, polyurethane, and styrofoam. The modified container can be made in various sizes to hold different quantities of glass slides and tubes. The modified container C–1 can hold test tubes or glass slides or both and has a bottom portion 1a and a top portion 2a. The bottom portion 1a has two relatively thick side walls 3a and two relatively thick end walls 4a. The side walls 3a have inner walls with grooves 5 therein formed by inwardly extending ribs 6. The grooves 5 are dimensioned to receive the end edges of glass slides of a standard dimension normally used in medical laboratories. The bottom portion 1a has an upstanding flange 7a around its inner portion of the top wall 8a. The flange 7a has an upper surface 9a and a lid orienting notch or cut-out 19 in the outer surface 20 thereof. The surface of the top wall 8a circumscribes said flange 7a. The inner portion of the flange 7a forms part of the inner surface of the side and end walls 3a and 4a. The bottom portion 1a has a relatively thick bottom 10a with an inner bottom surface 11a having slightly raised ribs 21 with numbers N for any slides which might be shipped. The bottom portion 1a has two transverse sections 22 and 23 with curved seats 24 for receiving test tubes. These test tubes are of a size usually used in a medical laboratory. The transverse section 22 is spaced from the one end by a small amount so that the stopper in the test tube is accommodated in the headspace 25. The other transverse section 23 is nearer to the center of the container C–1 so as to hold the lower portions of the test tubes. The test tubes frequently are of such a length that several slide positions, such as positions numbers 25 down to 20, may be available for slides even though four test tubes are positioned in the transverse sections 22 and 23.

The top portion 2a has a relatively thick top 12a having an outer top 13 and an inner top surface 14a having transverse ribs 26 and 27 of uniform cross-section directly above the transverse sections 22 and 23 in the bottom portion 1a. The top portion 2a has side walls 15a and end walls 16a which are thinner than the corresponding walls of the bottom portion 1a. The top walls 15a and 16a fit outwardly of the upstanding flange 7a in contacting relation, and have bottom portions 17a which seat on the top surface 8a of the bottom walls 3a and 4a. The top end wall 16a nearest the transverse rib 26 is provided with a curved projection 28 which fits into the cut-out 19 in the bottom portion 1a. The projection 28 insures that the top 2a will always be placed on the bottom 1a with the ribs 26 and 27 directly above the transverse sections 22 and 23, so as to maintain any test tubes therein in fixed immobile relation.

When the top and bottom portions are together, with slides and/or test tubes therein, they form a complete protective enclosure for the fragile contents. The portions 1 and 2 are adapted to be retained together by a wide piece of pressure-sensitive tape 18 having an address card printed thereon. The user simply places the test tubes and slides in the bottom portion 1a and places the top portion 2a thereon. The projection 28 and cut-out 19 prevent the top portion 2a from being placed on the bottom portion 1a in any incorrect manner. With the top portion 1a in its correct closed position, in which it prevents movement of the test tubes and slides in the container and protects them, the user may then address the address portion of the pressure-sensitive adhesive tape 18, place the tape 18 around three surfaces of the container C–1, and drop the package into a mail box. The tape 18 is applied over the top surface 13 and down the end walls to retain the top portion 2a in fixed assembled relation with the bottom portion 1a.

This invention is intended to cover all changes and modifications of the example of the invention herein chosen for purposes of the disclosure which do not constitute departures from the spirit and scope of the invention. Each container embodying the present invention not only provides protection for the contents, but also provides insulation to preserve any blood shipped in the container and decreases hemolysis or clotting.

What is claimed is:

1. A container for articles, said container made from a plastic material of low density having tiny enclosed cells, said container having a bottom portion and a top portion adapted to be secured together in assembled relation by pressure-sensitive adhesive tape, said tape being sufficiently wide to contain a mailing address and being adapted to be secured to the top wall of said top portion, said tape having ends which extend downwardly over the end walls of the top portion and the line of contact between the top and bottom portions, said bottom portion having a relatively thick horizontal bottom with a plurality of upstanding and relatively thick walls with an opening therein for receiving said articles, said walls having upstanding interior wall surfaces, at least one of said interior wall surfaces having means thereon made from said plastic material for holding articles in said opening in relatively immovable relation with respect to said walls, said walls having an upper surface with an upstanding flange surrounding said opening, said flange forming the upper portion of said interior walls, said top portion having a thick top wall and a plurality of relatively thick depending walls corresponding in number to the number of walls in the bottom portion, said depending walls in said top portion being thinner than said upstanding walls in said bottom portion and having a bottom edge adapted to sit on said bottom walls outwardly of said upstanding flanges, said thick top wall having a horizontal interior wall positioned in spaced relation above the top of said upstanding flange said means made from said plastic material for holding articles comprising vertical grooves in a pair of oppositely positioned vertical walls, said grooves being adapted to receive the opposite vertical edges of glass slide articles, the distance between horizontal interior surfaces of the top and bottom portions being slightly greater than the height of the glass slide articles positioned in said vertical grooves, said bottom portion being provided with two spaced transverse sections with aligned curved seats therein adapted to receive a plurality of test tubes in parallel relation longitudinally of said container, said top portion being provided with two spaced transverse ribs positioned directly above said transverse sections to prevent movement of any test tubes in the container when said container is closed.

2. The container set forth in claim 1 wherein the top and bottom portions are provided with orienting means to require the top portion to be placed on the bottom portion in only one manner with said transverse ribs being positioned directly above said transverse sections.

3. The container set forth in claim 1 wherein one transverse section is positioned near an end wall with only the headspace for a test tube therebetween and the other transverse section is positioned near the center of the container, so that said container can hold test tubes at one end in a position longitudinally of said container and can hold glass slides at the other end in a transverse position.

References Cited
UNITED STATES PATENTS

| | | | |
|---|---|---|---|
| 1,918,109 | 7/1933 | Joyce. | |
| 2,192,423 | 3/1940 | Ward et al. | |
| 2,606,708 | 8/1952 | Irvan | 206—45.2 X |
| 3,063,549 | 11/1962 | Weichselbaum | 206—62 X |
| 3,067,869 | 12/1962 | Denton | 206—62 X |
| 3,146,929 | 9/1964 | Keim | 206—65 X |
| 3,163,289 | 12/1964 | Laffkas et al. | 206—65 |
| 3,235,068 | 2/1966 | Asnes et al. | 206—62 |
| 3,243,037 | 3/1966 | Luertzing | 206—1 |

JAMES B. MARBERT, *Primary Examiner.*

LOUIS G. MANCENE, *Examiner.*

UNITED STATES PATENT OFFICE
CERTIFICATE OF CORRECTION

Patent No. 3,379,303                 April 23, 1968

John H. Jenkins

It is certified that error appears in the above identified patent and that said Letters Patent are hereby corrected as shown below:

Column 2, line 7, after "flange 7" cancel "in contacting relation, and have bottom portions" and insert -- forms part of the inner surface of the side and --.

Signed and sealed this 9th day of September 1969.

(SEAL)
Attest:

Edward M. Fletcher, Jr.             WILLIAM E. SCHUYLER, JR.
Attesting Officer                     Commissioner of Patents